United States Patent [19]
Boland

[11] Patent Number: 5,402,555
[45] Date of Patent: Apr. 4, 1995

[54] LINE FASTENER

[76] Inventor: Vincent J. Boland, 327 W. Broadway, Winona, Minn. 55987

[21] Appl. No.: 108,915

[22] Filed: Aug. 18, 1993

[51] Int. Cl.⁶ .................................................. F16G 11/00
[52] U.S. Cl. ................................... 24/129 C; 24/131 R
[58] Field of Search ............. 24/129 C, 129 W, 131 R, 24/130, 115 H, 115 K, 71.3, 566, 563, 3 D, 17 B, 16 R

[56] References Cited

U.S. PATENT DOCUMENTS

| | | |
|---|---|---|
| 125,795 | 4/1872 | Doubler ................... 24/131 |
| 602,693 | 4/1898 | Bradeen . |
| 610,105 | 8/1898 | Traver . |
| 785,694 | 3/1905 | Michel . |
| 793,505 | 6/1905 | Clay ...................... 24/131 |
| 1,155,976 | 10/1915 | Van Dyke ............... 24/131 |
| 1,244,797 | 10/1917 | Terrell .................... 24/131 |
| 1,495,912 | 5/1924 | Liefer ..................... 24/131 |
| 1,906,367 | 5/1933 | Camp . |

Primary Examiner—Victor N. Sakran
Attorney, Agent, or Firm—M. Paul Hendrickson

[57] ABSTRACT

The present invention provides a line tightening and fastening device which may be effectively used by mentally and physically handicapped persons. The fastening device includes laterally extending arms, each of which is equipped with an eyelet. The arms and eyelets are biased together in lateral alignment by a looped springed section which allows the eyelets to be forcibly sprung apart. When used, a tightening end of a fastening line or rope is strung through the eyelets, between the arms and then laterally between the eyelets. The line is tightened within the device simply by drawing upon the tightening line end to draw the line between eyelets. By drawing upon the opposite line or fastening end, the line becomes securely wedged between the eyelets and fastened onto the device.

19 Claims, 1 Drawing Sheet

LINE FASTENER

FIELD OF THE INVENTION

The present invention relates to rope engaging devices and more particularly a rope tightening and fastening device and its use.

BACKGROUND OF THE INVENTION

It is difficult and often impossible for certain handicapped persons to fasten and tie a rope to objects. The problem can arise in physically as well as mentally handicapped persons. Mentally handicapped individuals often have difficulty in learning elementary techniques of simple rope tieing. Physically handicapped individuals, especially those who may have lost an arm and/or fingers, are simply often physically unable to tie a knot. Fully competent and capable persons will occasionally be placed under circumstances wherein it is desirable or necessary to use a knotting device which may be easily tightened and fastened onto an object with one hand or lesser physical abilities. Although there has existed a need for a simple device which may effectively be roped and tied to an object, the fulfillment of this need has remained essentially unchanged.

SUMMARY OF THE INVENTION

The present invention affords a novel approach to the age old problem of an easier, expeditious and simpler technique of securely tightening and fastening a rope onto an object. The invention provides a knot tying device which enables severely mentally and/or physically handicapped individuals to effectively tie knots.

The rope tightening and fastening device comprises a pair of laterally extending arms each of which is equipped with an eyelet of sufficient size to allow a rope to be threaded through the eyelets. The arms and eyelets are held in a substantial lateral alignment by a springed section which biases the eyelets together while also permitting the eyelets to be laterally separated by a separating force.

The device may be simply and easily used by threading a tightening rope end of a rope through the eyelets and then by threading the rope between the laterally disposed eyelets. By tugging upon the tightening rope end, the rope may be drawn tightly onto the device. By drawing upon the opposite or fastening rope end, the rope becomes securely fastened thereto. The rope will remain securely fastened to the device until manipulatively unfastened from the device. The rope may be readily unfastened from the device by simply reversing the tying procedure.

DETAILED DESCRIPTION OF THE INVENTION

Figure 6:
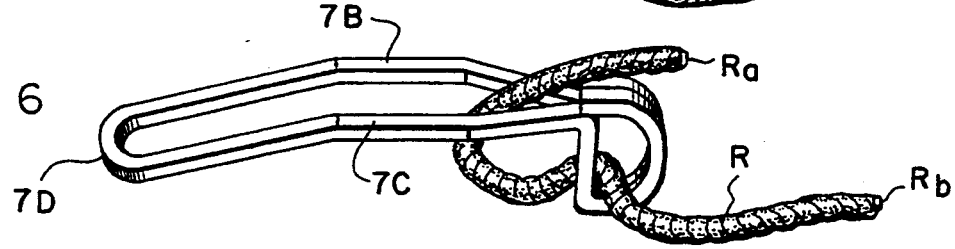
FIG. 6 further illustrates the use of the FIG. 5 device in securing a rope thereto.
Figure 7:
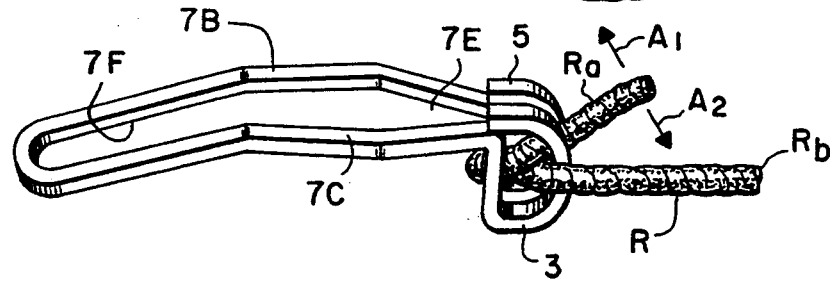
FIG. 7 shows the rope secured to the device shown in FIG. 5.
Figure 8:
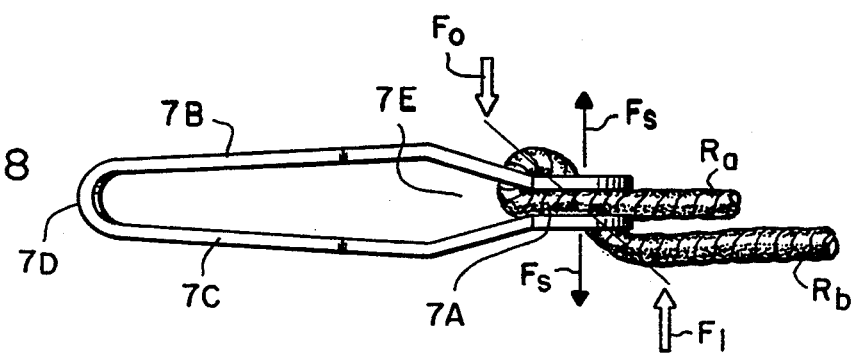
FIG. 8 illustrates directional forces which may be applied to a rope secured to the device shown in FIG. 7.

With reference to FIGS. 1–8, there is provided pursuant to the present invention a line tightening and fastening device (generally designated as 1) for tightening a line R (such as a rope) by drawing a line tightening end $R_a$ therethrough (e.g. see FIG. 5) and for fastening or immobilizing line R onto the device 1 by drawing upon the line fastening end $R_b$ (as illustrated by FIG. 8), said device 1 comprising:
  a) a first line looping section 3 for looping the fastening line R thereabout and applying a first biasing force (illustrated as $F_1$ in FIG. 8) by drawing the line fastening end $R_a$ onto looping section 3;
  b) a second line looping section 5 for looping the line fastening end $R_a$ thereabout and applying an opposing biasing force ($F_o$ as illustrated in FIG. 8) to said first biasing force $F_1$ when said line fastening rope $R_b$ is drawn onto said second
  looping section 5; and
  c) lateral retaining means (generally referenced as 7) for resiliently maintaining said first loop section 3 and said second loop section 5 in a lateral relationship with said lateral retaining means 7 affording a passageway 7A for tightening the line R within device 1 by drawing the line tightening end $R_a$ therethrough and for immobilizing the line R therewithin when drawing upon said line fastening end $R_b$ as illustrated in FIG. 8.

In the preferred embodiments, the first looped section 3 and the second looped section 5 comprise a pair of eyelets (3 and 5) of irregular surfaces 3A and 5A (shown in FIGS. 3 and 4 as rectangular rod stock with rectangular edges) which serve to grippingly restrain line R onto eyelets 3 and 5 when the line fastening end $R_a$ is drawn against irregular surfaces 3A and 5A. With particular reference to FIG. 8, the abrupt angular contours of rectangular edges 3A and 5A effectively serve as vectors for applying the opposing biasing forces ($F_0$ and $F_1$) onto eyelets 3 and 5 to wedge line R therebetween upon drawing against fastening line end $R_b$.

Eyelets 3 and 5 are depicted in the Figures as being joined together by a springed clamping section (depicted as 7D) which serves as the lateral retaining means for maintaining eyelets 3 and 5 in a substantially lateral displacement while also affording, when laterally separated, a passageway 7A for emplacing and tightening line R therewithin. As may be observed by reference to FIGS. 7 and 8, drawing upon the line tightening end $R_a$ permits line R to be drawn through loops 3 and 5 and between passageway 7A until tightened to the appropriate tightness. The depicted clamp 7 includes a pair of laterally extending arms 7B and 7C biased together by springed section 7D. Springed clamp 7 is preferably constructed of spring steel or other durable and resilient material possessing sufficient spring so as to allow for eyelets 3 and 5 to be drawn or spread apart when an eyelet spreading force $F_s$ (as depicted by FIG. 8) is applied to springed clasp 7. The entire device including arms 7B and 7C, springed section 7D and eyelets 3 and 5 may be directly fabricated by bending a stock material of sufficient structural spring and rigidity into the appropriate configuration as illustrated by the drawings.

The device 1, including the depicted springed clamp 7 and eyelets 3 and 5, when properly threaded or wound for use as sequentially illustrated by FIGS. 5–8, functions in a manner similar to a slip knot in that when the line tightening end $R_a$ is drawn, the springed clamp section 7D allows the line tightening end $R_a$ to be freely drawn through passageway 7A until rope R is tightened to the desired tautness, while tugging upon the line fastening end $R_b$ tautly draws eyelets 3 and 5 together and biases (see $F_0$ and $F_1$ of FIG. 8) the line R between eyelets 3 and 5 so as to knot and immobilize line R thereby.

The springed clamp section 7D may be of a closed looped design, (as depicted in the Figures), for accommodating an anchoring eye hook, staple, swivel, an adjoining fastening rope, etc. thereto. In the preferred depicted embodiments of the invention, the device 1 includes a forked handle section (generally enumerated as 7) closed at one end (springed section 7D) and equipped with two outwardly and laterally extending prongs or arms 7B and 7C biased together by springed section 7D and the pair of laterally disposed eyelets 3 and 5 secured onto said arms 7B and 7C. Eyelets 3 and 5, when laterally separated from one another, provide an open passageway 7A for line R to pass between eyelets 3 and 5 and arms 7B and 70. The forked arms 7B and 7C preferably converge inwardly to form a channeled V-section 7E which terminates onto eyelets 3 and 5. The confluent, channeled configuration 7E of arms 7B and 7C in cooperative association with springed section 7D operatively retain eyelets 3 and 5 at the appropriate lateral orientation while also serving to more effectively guide the line tightening end $R_a$ onto passageway 7A. The line tightening end $R_a$ is unlocked or unknotted from device 1 by simply pulling in an unlocking direction $A_1$ with tightening and ultimate locking of the line tightening end $R_a$ being accomplished by drawing $R_b$ in a locking direction $A_2$ as illustrated by the arrow representations in FIG. 7.

Arms 7B and 7C are effectively biased together at eyelets 3 and 5 by springed section 7D. The preferred construction of device 1 involves lateral displacement of arms 7B and 7C at a sufficient distance so as to allow for line fastening end $R_b$ to be easily threaded onto passageway 7A and secured between eyelets 3 and 5 as shown in FIGS. 7 and 8. By positioning lateral extending arms 7B and 7C so as to converge together in the form of a V-channeled section 7E, the channeled arms section 7E effectively serves as a self-threading channel for threading and securing the line fastening end $R_a$ within passageway 7A and between eyelets 3 and 5. Springed section 7D possesses sufficient tension or spring to effectively bias eyelets 3 and 5 together while also permitting eyelets 3 and 5 to separate apart when a separating force $F_s$ such as when the wedged line R is applied thereto as depicted by the illustrations of FIGS. 6–8.

The device should be constructed of materials possessing sufficient strength and rigidity so as to maintain eyelets 3 and 5 (and preferably arms 7B and 7C) in a substantially lateral alignment. By maintaining eyelets 3 and 5 in a substantially lateral relationship, the appropriate forces may then be applied to a properly threaded line R (as illustrated by FIGS. 7 and 8) so as to permit line R to be tightened by drawing upon line tightening end $R_a$ or securely fastened by drawing tightly upon the line fastening end $R_b$. Eyelets 3 and 5 serve to retain the line R therewithin and preferably fabricated of a closed looped construction as depicted in FIGS. 2 and 5–7.

The device 1 may be appropriately constructed from a variety of materials (e.g. plastic, metal, composites, etc.) possessing sufficient strength and rigidity to maintain the eyelets 3 and 5 at the appropriate lateral orientation when tightening and fastening a line R thereto. Although the device 1 may be constructed of non-directional surfaced materials (e.g. round materials), directionally surfaced materials (especially those constructed of a polygonal material with abrupt angular faced surfaces) are preferred. Such materials contribute strength by maintaining eyelets 3 and 5 in the appropriate biasing lateral relationship while also providing an effective biasing surface for line R to bias onto the device 1. An irregular or edged surface permits the fastened line R to tenaciously grip onto eyelet 3 and 5 surfaces and apply the opposing biasing forces ($F_0$ and $F_1$) as illustrated in FIG. 8. Angular rod stock materials (e.g. triangular, rectangular or square, hexagonal, octagonal, etc.) constructed of a relatively hard metals (e.g. such half-hard cold rolled steel square stock) appropriately bent (as depicted in the Figures) so as to provide sufficient tension to bias the eyelets 3 and 5 together and maintain the eyelets 3 and 5 in a lateral relationship provide a particular effective material for fabricating eyelets 3 and 5 and the lateral retaining means 7.

Figure 1:
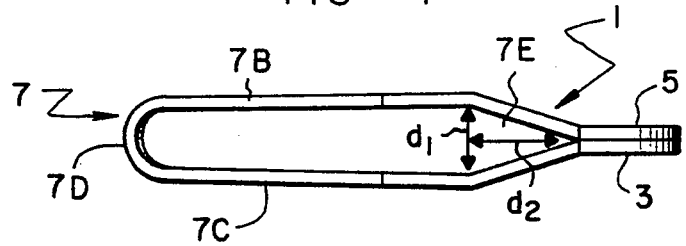
FIG. 1 is a top view of the rope tightening and fastening device of this invention.
Figure 3:
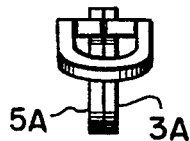
FIG. 3 is a rear view of the device shown in FIG. 1.
Figure 2:
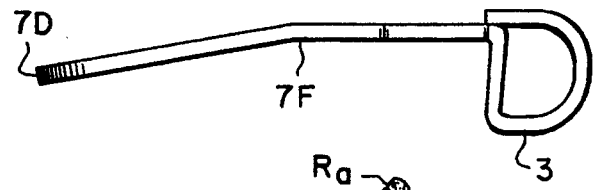
FIG. 2 is a side view of the device shown in FIG. 1.
Figure 4:
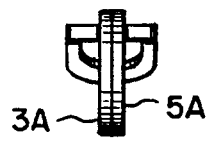
FIG. 4 is a frontal view of the device shown in FIG. 1.
Figure 5:
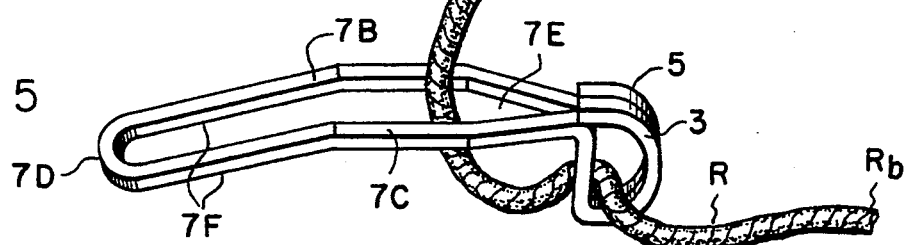
FIG. 5 is a top elevational view illustrating the use of the device of FIG. 1 in fastening a rope thereto.

The configuration and size of the V-shaped channel 7E of arms 7B and 7C channeling onto eyelets 3 and 5 will have a bearing as to whether or not line R may be effectively self-fed or slipped onto passageway 7A when the line tightening end $R_b$ is drawn between eyelets 3 and 5 as depicted by FIGS. 5–7. If the lateral distance between arms 3 and 5 at the V-groove bend (indicated as $d_1$ in FIG. 1) is less than the lateral epicenter distance (depicted as $d_2$ in FIG. 1) from the arm bends to eyelet passageway 7A, line R may then be effectively channeled between eyelets 3 and 5 (i.e. self-threading attributes) when the line tightening end $R_a$ looped through eyelets (3 and 5) and between arms is drawn between eyelets 3 and 5 as illustrated by the sequential depiction of FIGS. 5–7. The channeled configuration of arms 7B and 7C easily and effectively channels line R to a correct self-threaded position within passageway 7A and between eyelets 3 and 5 without necessitating a physical or manual separation of eyelets 3 and 5 from one another in order to thread a line R within a passageway 7A. The lateral distance $d_1$ between arm 7A and 7B is also preferably of a size sufficient so as to allow a line R to freely pass therebetween. The lateral distance $d_1$ may be modified (as well as arm and eyelet size) to match the diameter of the line R to be secured to device 1.

As previously indicated, the surface of the eyelets 3 and 5 is preferably irregular or directional as opposed to a non-directional surface such as provided by a circular surface. Angular surfaces such as created by a polygonal structure (e.g. triangular, rectangular, pentagonal, hexagonal, octagonal, etc.) afford greater strength and a more effective surface region for supporting and wedging line therebetween. A polyangular structure with opposing angular edges (3A and 5A) provides pressure sites ($F_0$ and $F_1$) for biasing the loops 3 and 5 tightly together by drawing upon the line fastening end $R_b$.

The depicted device 1 may be effectively used in fastening lines R about soft or resilient materials. When using device 1 to tighten and fasten upon such soft materials, the eyelets 3 and 5 may become embedded within the soft material. This may inhibit or prevent eyelets 3 and 5 from separating during the unlatching of line R therefrom. The depicted device 1 has been modified so as to include a configuration which permits the device 1 to be rotated (while fastened) about its major longitudinal axis. Such a configuration will allow the device 1 to be rotated upon its side as illustrated in FIG. 8, which in turn relieves any pressure applied onto eyelets 3 and 5 by the soft material so that eyelets 3 and 5 may then be easily separated and the line fastening end $R_a$ readily unfastened from passageway 7A by applying an unfastening force $A_1$ thereto. This modification may then be simply accomplished by creating a downwardly extending vertical bend $7_f$ within downwardly extending the arms 7B and 7C as illustrated by the side view of FIG. 2 and in FIGS. 5–7.

The device 1 of this invention may be used to tighten and fasten a line R to the device 1 as illustrated by FIGS. 5–8. The present invention accordingly provides a method for tightening and fastening a line R (fitted with a line tightening end $R_a$ and a line fastening end $R_b$) to a line fastening device 1 comprised of a pair of laterally extending arms (7B and 7C) biased together by a springed clamp section (7D) and a pair of lateral disposed eyelets (3 and 5) respectively connected to said arms for looping and fastening the rope R thereto, said method comprising:

A) passing the line tightening end $R_a$ through said eyelets (3 and 5);
B) threading the line tightening end $R_a$ between said laterally extending arms;
C) laterally inserting the line tightening end $R_a$ between said eyelets 3 and 5; and
D) tightening line R by drawing the line tightening end $R_a$ between said eyelets 3 and 5 until the line R is tightened sufficiently within said device 1. Line R may thereafter be securely fastened onto device 1 by drawing upon the line fastening end $R_b$ with sufficient force to firmly bias and secure line R between eyelets 3 and 5. Line R may be unfastened from the device 1 by reversing the aforementioned sequential steps.

The line fastening device 1 of this invention may be effectively used to fasten onto a wide variety of flexible binders or tieing lines R. In general, if the line R may be knotted, it can then be used as a binding line R in the present device 1. Conventional binders R such as lines, ropes, strings, flexible cables, cords, fibers, threads, twine, straps, yarns, etc., in diverse shapes (e.g. circular, rectangular, ovular, flat, etc.) which possess sufficient flexibility to be threaded through and biased against the device 1 may be adapted for use with the device 1. Accordingly, flexible line fastening materials fabricated from a host of natural occurring and synthetically made materials may be tightened and fastened to the device 1. Synthetic fastening materials (e.g. nylon, rayon, polyolefins, etc.) as well as those flexible line fasteners fabricated from natural materials (e.g. leather, cotton, hemp, etc.) may accordingly be effectively used as a line R with the line fastener device 1 of this invention.

The device 1 may be threaded with line R from either side, looped either forward or backward and emplaced between the loop from a forward or aft position. Such alternative threadings may be applied provided the mode of operation of the device 1 by allowing the line R to be tightened or wedged between the loops remains unchanged.

What is claimed is:

1. A line tightening and fastening device for tightening a line disposed within said device when a line tightening end of the line is drawn and for fastening the line against the device upon drawing a line fastening end of the line, said device comprising:
   a) a first line retaining loop for threading the line tightening end therethrough and applying a first biasing force against the first loop when the line fastening end is drawn against the first loop;
   b) a second line retaining loop for threading the line tightening end from said first loop therethrough and for applying onto said second loop an opposing biasing force to said first biasing force by drawing the line fastening end onto said second loop; and
   c) lateral retaining means for maintaining said first loop and said second loop in a substantially lateral relationship while also permitting the line tightening end looped about said second loop and to be emplaced between said first loop and said second loop, with said device serving to tighten the line upon the drawing the tightening line end between said first loop and said second loop and to fasten the line therebetween by drawing upon the line fastening end so as to apply the first biasing force against said first loop and said opposing biasing force against said second loop and thereby firmly wedge the line between said first loop and said second loop.

2. The device according to claim 1 wherein the lateral retaining means include a pair of laterally extending arms.

3. The device according to claim 2 wherein the pair of laterally extending arms are retained in a lateral relationship by a springed section which serves to bias the laterally extending arms towards one another.

4. The device according to claim 2 wherein the first loop and the second loop comprise a pair of line retaining eyelets supportively maintained in a substantially lateral alignment to one another by said laterally extending arms.

5. The device according to claim 1 wherein the lateral retaining means comprises a U-shaped clamping unit equipped with a springed section and a pair of laterally extending arms biased towards one another and retained in a substantially lateral relationship by said springed section.

6. The device according to claim 5 wherein said first loop and said second loop respectively comprise a pair of line retaining eyelets respectively supportively maintained in a substantially lateral alignment by said arms.

7. The device according to claim 5 wherein the eyelets include abrupt angular surface contours for applying said first biasing force and said opposing biasing force to said eyelets.

8. The device according to claim 7 wherein the laterally extending arms converge onto the eyelets in a channeled relationship sufficient to permit the line tightening end of the line to be channeled onto the eyelets when the tightening line end is drawn with sufficient force to channel the line tightening end between said eyelets.

9. A line tightening and fastening device which tightens a line disposed within said device when drawing upon a line tightening end of the line and fastens the line to the device upon drawing of a line fastening end of the line, said device comprising:
   a) a first line retaining loop for threading the line tightening end therethrough and applying a first biasing force against the first loop when the line fastening end is drawn against the first loop;

b) a second line retaining loop adapted for looping the line tightening end from said first loop therethrough and for applying onto said second loop an opposing biasing force to aid first biasing force by drawing the line fastening end onto said second loop; and c) lateral retaining means for biasing together and maintaining said first loop and said second loop in a substantially lateral and parallel relationship while also allowing the line tightening end looped about said second loop to be emplaced between said first loop and said second loop and drawn therebetween so as to permit tightening of the line thereby and for fastening the line between the first loop and the second loop by applying tension upon the fastening line end to wedge the line therebetween.

10. The device according to claim 9 wherein the first loop and second loop comprise a pair of substantially rigid eyelets for retaining the line therewithin.

11. The device according to claim 10 wherein the lateral retaining means comprises a pair of laterally positioned arms respectively connected to said pair of eyelets and biased together by a common biasing connecting section for said arms.

12. The device according to claim 11 wherein the common biasing connecting section biases the eyelets together with a sufficient force to permit the line tightening end to be laterally emplaced between said eyelets and drawn therebetween.

13. The device according to claim 12 wherein the arms are spatially aligned so as to form a channel converging onto the eyelets for channeling the line tightening end between said eyelets.

14. The device according to claim 10 wherein the eyelets include an irregular biasing surface for applying said first biasing force and said opposing biasing force against said eyelets.

15. The device according to claim 9 wherein the lateral retaining means comprises a rectangular shaped metal substrate bent onto a U-shaped configuration so as to provide springed U-section and a pair of laterally extending arms biased inwardly by said springed U-section rigid.

16. A method for tightening and fastening a line onto a fastening device in which a portion of the line serves as a line tightening end and an opposing segment of the line serves as a fastening end and the device consists essentially of a pair of laterally positioned arm, a pair of rigid eyelets connectively maintained in lateral alignment by said arms and a common biasing section for biasing said eyelets together, said method comprising: threading the line tightening end through said eyelets, looping the threaded line tightening end about one of the eyelets, emplacing the portion of the line tightening end of the looped line between said eyelets, drawing the portion of the line tightening end between the eyelets to tighten the line onto the device, and fastening the line to the device by applying a sufficient force upon the opposing segment of the line fastening end to wedge the line between said eyelets.

17. The method according to claim 16 wherein after threading and looping the line tightening end through said eyelets, the portion of line tightening end is inserted between said arms and said eyelets so as to bear a directional alignment onto a direction of force as applied when drawing upon the segment of the line fastening end to wedge the segment of the line tightening end between said eyelets.

18. The method according to claim 16 wherein the portion of the line tightening end is subsequently withdrawn from between the eyelets to unfasten the line from the device.

19. The method according to claim 16 wherein the arms of the device include a channelling section coverging onto said eyelets and the portion of line tightening end is drawn with sufficient force so as to draw the portion of line tightening end between said channelling section and said eyelets.

* * * * *